(12) United States Patent
Tanaka et al.

(10) Patent No.: US 9,108,563 B2
(45) Date of Patent: Aug. 18, 2015

(54) HEAD LAMP FOR VEHICLE INCLUDING PLURAL LIGHT SOURCE UNITS

(71) Applicant: Toyoda Gosei Co., Ltd., Kiyosu-shi, Aichi-ken (JP)

(72) Inventors: Yoshiharu Tanaka, Kiyosu (JP); Kazuhito Kawamura, Kiyosu (JP)

(73) Assignee: TOYODA GOSEI CO., LTD., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/688,118

(22) Filed: Nov. 28, 2012

(65) Prior Publication Data

US 2013/0135886 A1 May 30, 2013

(30) Foreign Application Priority Data

Nov. 29, 2011 (JP) ................................. 2011-260908

(51) Int. Cl.
*F21V 7/00* (2006.01)
*B60Q 1/04* (2006.01)
*F21S 8/10* (2006.01)

(52) U.S. Cl.
CPC ............... *B60Q 1/04* (2013.01); *F21S 48/1104* (2013.01); *F21S 48/1159* (2013.01); *F21S 48/1305* (2013.01); *F21S 48/1317* (2013.01); *F21S 48/1747* (2013.01)

(58) Field of Classification Search
CPC ... F21S 48/1225; F21S 48/1317; F21S 4/003; F21S 8/003; F21S 48/1323; F21S 48/1388; F21S 48/1752; F21S 48/1159; F21S 48/13; F21S 48/215; F21S 48/1757

USPC ......... 362/297, 346, 516, 517, 518, 519, 547, 362/543–545
See application file for complete search history.

(56) References Cited

U.S. PATENT DOCUMENTS

| | | | | |
|---|---|---|---|---|
| 3,688,149 | A * | 8/1972 | Pitkjaan | 313/114 |
| 6,543,922 | B2 * | 4/2003 | Komatsu et al. | 362/518 |
| 7,156,544 | B2 * | 1/2007 | Ishida | 362/538 |
| 7,311,430 | B2 * | 12/2007 | Tsukamoto et al. | 362/545 |
| 7,419,290 | B2 * | 9/2008 | Inaba | 362/538 |
| 7,985,013 | B2 * | 7/2011 | Yasuda | 362/547 |
| 8,534,888 | B2 * | 9/2013 | Yasuda et al. | 362/539 |

(Continued)

FOREIGN PATENT DOCUMENTS

| CN | 101725879 A | 6/2010 |
|---|---|---|
| CN | 101852417 A | 10/2010 |

(Continued)

OTHER PUBLICATIONS

Japanese Office Action dated Aug. 19, 2014 with an English translation thereof.

(Continued)

*Primary Examiner* — Robert May
(74) *Attorney, Agent, or Firm* — McGinn IP Law Group, Pllc (57) ABSTRACT

To provide, at a low cost, a head lamp for a vehicle having a low-beam lamp and a high-beam lamp, which is high in the utilization factor of light and can irradiate a wide area, the present invention is provided with a head lamp for a vehicle which includes a low-beam light source unit that is a reflective type and a high-beam light source unit that is a projector type and is disposed beneath the low-beam light source unit.

8 Claims, 5 Drawing Sheets

(56) References Cited

U.S. PATENT DOCUMENTS

| | | | |
|---|---|---|---|
| 8,579,484 B2 * | 11/2013 | Sugie | 362/516 |
| 8,845,161 B2 * | 9/2014 | DiPenti et al. | 362/545 |
| 8,851,723 B2 * | 10/2014 | Peck et al. | 362/516 |
| 2007/0086202 A1 | 4/2007 | Tsukamoto et al. | |
| 2008/0007961 A1 * | 1/2008 | Mochizuki et al. | 362/465 |
| 2008/0080201 A1 * | 4/2008 | Specht et al. | 362/507 |
| 2008/0247177 A1 * | 10/2008 | Tanaka et al. | 362/373 |
| 2009/0080211 A1 | 3/2009 | Yasuda | |
| 2009/0097247 A1 * | 4/2009 | Tseng et al. | 362/241 |
| 2010/0110710 A1 * | 5/2010 | Abe | 362/514 |
| 2010/0110711 A1 | 5/2010 | Ookubo et al. | |
| 2010/0244649 A1 | 9/2010 | Inaba | |
| 2010/0246205 A1 * | 9/2010 | Tanaka et al. | 362/544 |
| 2011/0141742 A1 * | 6/2011 | Tanaka et al. | 362/294 |
| 2012/0140503 A1 * | 6/2012 | Ahn et al. | 362/514 |
| 2013/0215632 A1 | 8/2013 | Jackl et al. | |

FOREIGN PATENT DOCUMENTS

| | | | |
|---|---|---|---|
| CN | 201162982 Y | | 1/2011 |
| CN | 102330948 A | | 1/2012 |
| JP | 2007-109493 A | | 4/2007 |
| JP | 2007103212 A | * | 4/2007 |
| JP | 2007-287610 A | | 11/2007 |
| JP | 2008-192313 A | | 8/2008 |
| JP | 2010-225462 A | | 10/2010 |
| JP | 4563912 B2 | | 10/2010 |
| JP | 2011-003347 A | | 1/2011 |
| JP | 4697951 B2 | | 6/2011 |
| JP | 2011-181279 A | | 9/2011 |
| JP | 2013-545223 A | | 12/2013 |

OTHER PUBLICATIONS

Chinese Office Action dated Jul. 30, 2014 with an English translation thereof.

* cited by examiner

HEAD LAMP FOR VEHICLE INCLUDING PLURAL LIGHT SOURCE UNITS

BACKGROUND OF THE INVENTION

1. Field of the Invention

The present invention relates to a head lamp for a vehicle.

2. Description of the Related Art

Projector type or reflective type light source units (lamp units) have been used as head lamps for vehicles.

The reflective type light source unit does not include a projector lens, it includes a light source and a reflector, whereby light emitted from the light source is reflected and irradiated to a desired direction by the reflector.

The projector type light source unit includes a projector lens and a shade in addition to a light source and a reflector.

Japanese Patent No. 4563912 discloses a head lamp structure for a vehicle, in which a plurality of low-beam lamps are disposed at upper positions and at least one high-beam lamp is disposed at a lower position, and each of the low-beam lamps and the high-beam lamp is configured as a projector type.

JP-A-2010-225462 discloses a head lamp for a vehicle, in which a first low-beam part is disposed at an upper position and a second low-beam part is disposed at a lower position, each of the first low-beam part and the second low-beam part is configured as a reflective type, and a frame for holding the first low-beam part and the second low-beam part and a frame for holding a high-beam part are integrally provided.

The projector type light source unit has the following problems.

(1) The projector lens and the shade become necessary.

(2) Since the projector lens is expensive, the cost of this light source unit increases together with the effects of (1).

(3) The utilization factor of light reduces due to the optical loss caused by the projector lens.

(4) Although this light source unit is suitable for condensing and distributing light at a distant area as compared with the reflective type light source unit, this light source unit is not suitable for irradiating a wide area.

According to the technique of Japanese Patent No. 4563912, since the plurality of projector type low-beam lamps are provided in addition to that each of the low-beam lamp and the high-beam lamp is configured as the projector type, the problems (1) and (2) become more apparent.

SUMMARY OF THE INVENTION

This invention is made in order to solve the problems. An object of this invention is to provide, at a low cost, a head lamp for a vehicle having a low-beam lamp and a high-beam lamp, which is high in the utilization factor of light and can irradiate a wide area.

Inventors of this invention have repeatedly studied ideas in order to solve the aforesaid problems and thought the following aspects of this invention.

<First Aspect>

The first aspect of this invention is provided with a head lamp for a vehicle, comprising a low-beam light source unit that is a reflective type, and a high-beam light source unit that is a reflective type and disposed beneath the low-beam light source unit.

According to the first aspect, since the vehicle head lamp does not include the light source unit of the projector-type, the problems of the light source unit of the projector type can be solved. Accordingly, the vehicle head lamp having the advantages of the reflective type (high in a light utilization factor, capable of irradiating a wide area, low cost) can be provided.

<Second Aspect>

The second aspect of this invention is arranged in a manner that, in the first aspect, the vehicle head lamp further comprises a light source attachment portion fixedly holding the low-beam light source unit and the high-beam light source unit, wherein the low-beam light source unit is fixedly attached to an upper surface side of the light source attachment portion, and the high-beam light source unit is fixedly attached to a lower surface side of the light source attachment portion.

According to the second aspect, since only the light source attachment portion is required as a member for fixedly holding each of the two light source units, the number of the components and the cost can be reduced.

<Third Aspect>

The third aspect of this invention is arranged in a manner that, in the vehicle head lamp according to the first aspect, the low-beam light source unit includes a low-beam light source and a low-beam reflector reflecting light emitted from the low-beam light source; the high-beam light source unit includes a high-beam light source and a high-beam reflector reflecting light emitted from the high-beam light source; and an area of the high-beam reflector is larger than that of the low-beam reflector.

According to the third aspect, the wide and distant distribution light most suitable for the high beam can be obtained.

<Fourth Aspect>

The fourth aspect of this invention is arranged in a manner that, in the vehicle head lamp according to the third aspect, a notch is formed at both sides of the low-beam reflector so that a reflection face is not provided and a reflection face is formed at both sides of the high-beam reflector.

According to the fourth aspect, each of the both sides of the low-beam reflector is not provided with the reflection face and is transparent. Thus, since the direct light of the low-beam light source can be irradiated toward the both side directions from the both sides of the low-beam reflector, respectively, the prolonged distribution light in the horizontal direction most suitable for the low beam can be obtained.

<Fifth Aspect>

The fifth aspect of this invention is arranged in a manner that, in the vehicle head lamp according to the third, a longitudinal length of the high-beam reflector is formed to be larger than that of the low-beam reflector.

According to the fifth aspect, the high-beam light source is attached downward with respect to the light source attachment portion. Thus, since the longitudinal length of the high-beam reflector is set to be larger, the light irradiated toward the road surface direction can be reflected in the distance and above the cut line (shading boundary line), and hence the distribution light is more preferable as the high beam.

<Sixth Aspect>

The sixth aspect of this invention is arranged in a manner that, in the vehicle head lamp according to the third aspect, the low-beam light source and the high-beam light source are fixedly attached to the light source attachment portion, and an attachment position of the low-beam light source in the light source attachment portion is set to forward side than an attachment position of the high-bream light source.

According to the sixth aspect, since the direct light of the low-beam light source is likely irradiated, the distribution light suitable for overhead road signs can be obtained.

Further, according to the sixth aspect, since the entire longitudinal length of the vehicle head lamp can be suppressed from being large irrespective that the longitudinal length of the high-beam reflector is set to be large like the fifth aspect, the miniaturization of the vehicle head lamp can be realized.

<Seventh Aspect>

The seventh aspect of this invention is arranged in a manner that, in the sixth aspect, the vehicle head lamp further includes a heat sink integrally formed with the light source attachment portion, and a plurality of radiation fins protruded on one side of the heat sink opposing to other side thereof where the light source attachment portion is provided, wherein the attachment position of the high-beam light source to the light source attachment portion is set to be closer to the plurality of radiation fins than the attachment position of the low-beam light source.

The high-beam light source fixedly attached to the lower surface side of the light source attachment portion is low in the heat radiation efficiency as compared with the low-beam light source fixedly attached to the upper surface side of the light source attachment portion.

In this respect, according to the seventh aspect, since the high-beam light source is disposed at the position closer to the radiation fins, the heat radiation efficiency of the high-beam light source can be improved.

DESCRIPTION OF THE PREFERRED EMBODIMENTS

Hereinafter a head lamp 10 for a vehicle according to an embodiment realizing this invention will be explained with reference to drawings.

As shown in FIGS. 1 to 4, the vehicle head lamp 10 is configured by a heat sink 11 (a wall part 11a, a light source attachment portion 11b, a radiation fin part 11c), a low-beam light source unit 12 (a light source 12a, a reflector 12b, a holder 12c), a high-beam light source unit 13 (a light source 13a, a reflector 13b, a holder 13c) etc.

The heat sink 11 is integrally formed by light-weighted material with a high thermal conductivity and a high electrical conductivity (metal, conductive composite resin etc., for example). The heat sink is configured by the wall part 11a, the light source attachment portion (base) 11b, the radiation fin part 11c etc.

In particular, the heat sink 11 is preferably formed by material with a thermal conductivity of 200 W/(m·k) or more such as aluminum or aluminum alloy.

The wall part 11a has a rectangular tabular shape. The light source attachment portion 11b is protruded on the front face side (major surface side) of the wall part 11a. The radiation fin part 11c is protruded on the back face side (rear surface side) of the wall part 11a. The wall part 11a extends almost in the vertical direction with respect to the optical axis direction of the vehicle head lamp 10.

The light source attachment portion 11b has a rectangular tabular shape and is protruded almost in the vertical direction with respect to the wall part 11a. That is, the light source attachment portion 11b extends in the optical axis direction of the vehicle head lamp 10.

The low-beam light source unit (low-beam lamp) 12 is fixedly attached to the upper surface side of the light source attachment portion 11b. The high-beam light source unit (high-beam lamp) 13 is fixedly attached to the lower surface side of the light source attachment portion 11b.

The radiation fin part 11c is configured by a plurality of fins (9 fins in the illustrated example) each having a rectangular tabular shape and being extended in the longitudinal direction of the heat sink 11. These fins are disposed in parallel to each other with an interval in the transverse direction of the heat sink 11.

The low-beam light source unit 12 is a light source unit that is a reflective type and configured by the light source (light emitting element) 12a, the reflector 12b, the holder 12c etc.

The light source 12a is disposed on the upper surface side of the light source attachment portion 11b of the heat sink 11 and fixedly attached to the light source attachment portion 11b by using the holder 12c. Thus, this light source irradiates light toward the upper direction of the light source attachment portion 11b.

The light source 12a is an optical semiconductor element (semiconductor type light source) such as an LED element.

The reflector 12b is fixedly attached to the upper surface side of the light source attachment portion 11b and provided with a light reflection face which is formed by a spheroidal paraboloid curved toward the lower surface side in a concave shape.

A notch 55 is formed at each of the both sides of the reflector 12b. Thus, each of the both sides of the reflector is not provided with the reflection face and is transparent.

In the low-beam light source unit 12, when the light source 12a is turned on, a part of the light emitted from the light source 12a is reflected by the reflection face of the reflector 12b and irradiated toward the lower side in the forward direction of the vehicle head lamp 10. Further, another part of the light emitted from the light source 12a is irradiated as a direct light toward the forward direction of the vehicle head lamp 10. Thus, the distribution light suitable for the low beam can be obtained.

Figure 5:
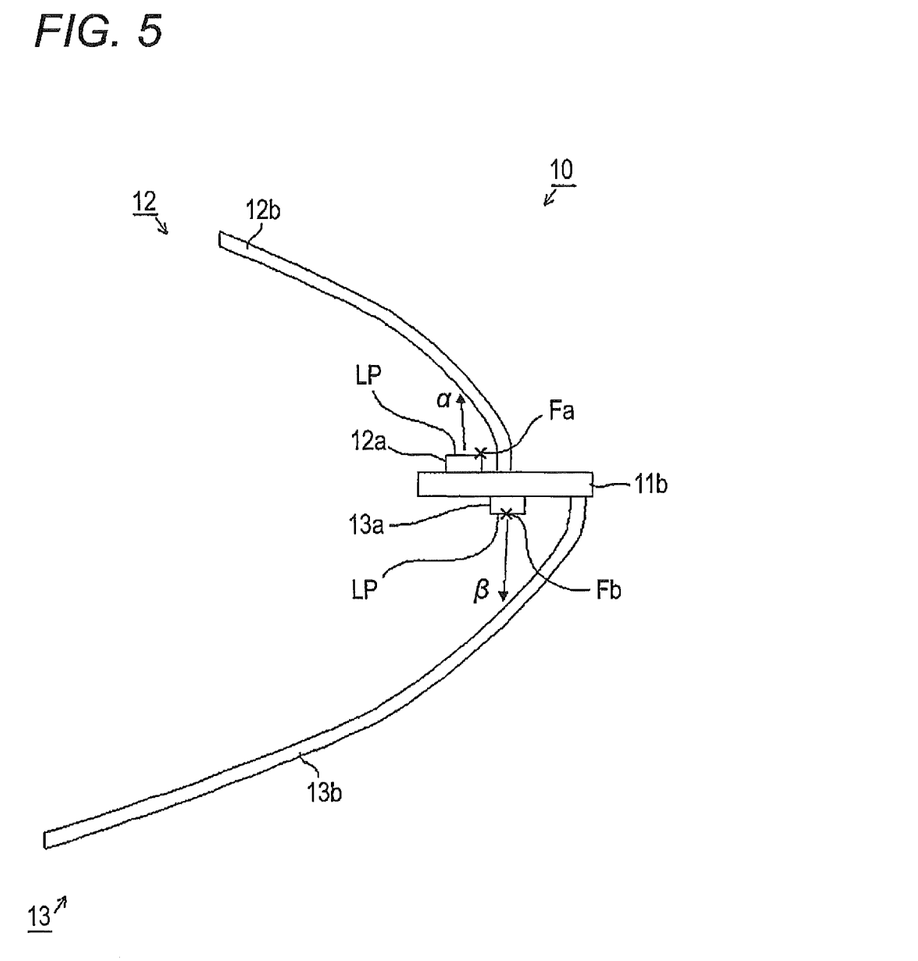
FIG. 5 is an end view of the schematic longitudinal sectional diagram of the main part of the vehicle head lamp 10, cut along the line X-X in FIGS. 2 and 3.

As shown in FIG. 5, since the light source 12a is attached upward with respect to the light source attachment portion 11b, the light is irradiated upward (direction shown by an arrow α). Further, the rear end of the light emitting face (light emitting area) LP of the light source 12a coincides with the focal point Fa of the reflection face of the reflector 12b.

The high-beam light source unit 13 is a light source unit of a reflective type and configured by the light source 13a, the reflector 13b, the holder 13c etc.

The light source 13a is disposed on the lower surface side of the light source attachment portion 11b of the heat sink 11 and fixedly attached to the light source attachment portion 11b by using the holder 13c. Thus, this light source irradiates light toward the lower direction of the light source attachment portion 11b.

The attachment position of the light source 12a to the light source attachment portion 11b is set to the forward side than the attachment position of the light source 13a.

The attachment position of the light source 13a to the light source attachment portion 11b is set to be closer to the radiation fin part 11c than the attachment position of the light source 12a.

The light source 13a has the same configuration as the light source 12a.

The reflector 13b is fixedly attached to the lower surface side of the light source attachment portion 11b and provided with a light reflection face which is formed by a spheroidal paraboloid curved toward the upper surface side in a concave shape.

An area and a longitudinal length of the reflection face of the reflector 13b are formed to be larger than those of the reflector 12b, respectively.

The longitudinal length of each of the reflectors 12b and 13b represents the longitudinal length thereof in the optical axis direction of the vehicle head lamp 10.

Unlike the reflector 12b, the reflector 13b is provided with the reflection face at each of the both side portions thereof.

Further, the width of the reflector 13b is formed to be larger than that of the reflector 12b.

The width of each of the reflectors 12b and 13b represents the length thereof orthogonal to the optical axis direction of the vehicle head lamp 10, that is, the length thereof in the transversal direction of the vehicle.

In the high-beam light source unit 13, when the light source 13a is turned on, a part of the light emitted from the light source 13a is reflected by the reflection face of the reflector 13b and irradiated toward the upper side in the forward direction of the vehicle head lamp 10. Further, another part of the light emitted from the light source 13a is irradiated as a direct light toward the lower side in the forward direction of the vehicle head lamp 10. Thus, the distribution light suitable for the high beam can be obtained.

As shown in FIG. 5, since the light source 13a is attached downward with respect to the light source attachment portion 11b, the light is irradiated downward (direction shown by an arrow β). Further, the center portion of the light emitting face LP of the light source 13a coincides with the focal point Fb of the reflection face of the reflector 13b.

The vehicle head lamp 10 according to this embodiment can attain the following actions and effects.

[1] The vehicle head lamp 10 includes the low-beam light source unit 12 of the reflective type and the high-beam light source unit 13 of the reflective type disposed beneath the low-beam light source unit 12.

Thus, since there is not provided with the light source unit that is the projector type, it is possible to solve the problems of the light source unit of the projector type. Accordingly, the vehicle head lamp 10 having the advantages of the reflective type (high in the light utilization factor, capable of irradiating a wide area, low cost) can be provided.

[2] The light source attachment portion 11b for fixedly holding each of the light source units 12 and 13 is provided. The low-beam light source unit 12 is fixedly attached to the upper surface side of the light source attachment portion 11b, and the high-beam light source unit 13 is fixedly attached to the lower surface side of the light source attachment portion 11b. Thus, since only the light source attachment portion 11b is required as a member for fixedly holding each of the light source units 12 and 13, the number of the components and the cost can be reduced.

[3] The area of the high-beam reflector 13b is formed to be larger than that of the low-beam reflector 12b.

Thus, the wide and distant distribution light most suitable for the high beam can be obtained.

[4] Each of the both sides of the low-beam reflector 12b is not provided with the reflection face and is transparent, but each of the both sides of the high-beam reflector 13b is provided with the reflection face.

Thus, since the direct light of the low-beam light source 12a can be irradiated toward the both side directions from the both sides of the low-beam reflector 12b, respectively, the prolonged distribution light in the horizontal direction most suitable for the low beam can be obtained.

[5] The longitudinal length of the high-beam reflector 13b is formed to be larger than that of the low-beam reflector 12b.

The high-beam light source 13a is attached downward with respect to the light source attachment portion 11b. Thus, since the longitudinal length of the high-beam reflector 13b is set to be larger, the light irradiated toward the road surface direction can be reflected in the distance and above the cut line, and hence the distribution light is more preferable as the high beam.

Figure 1:
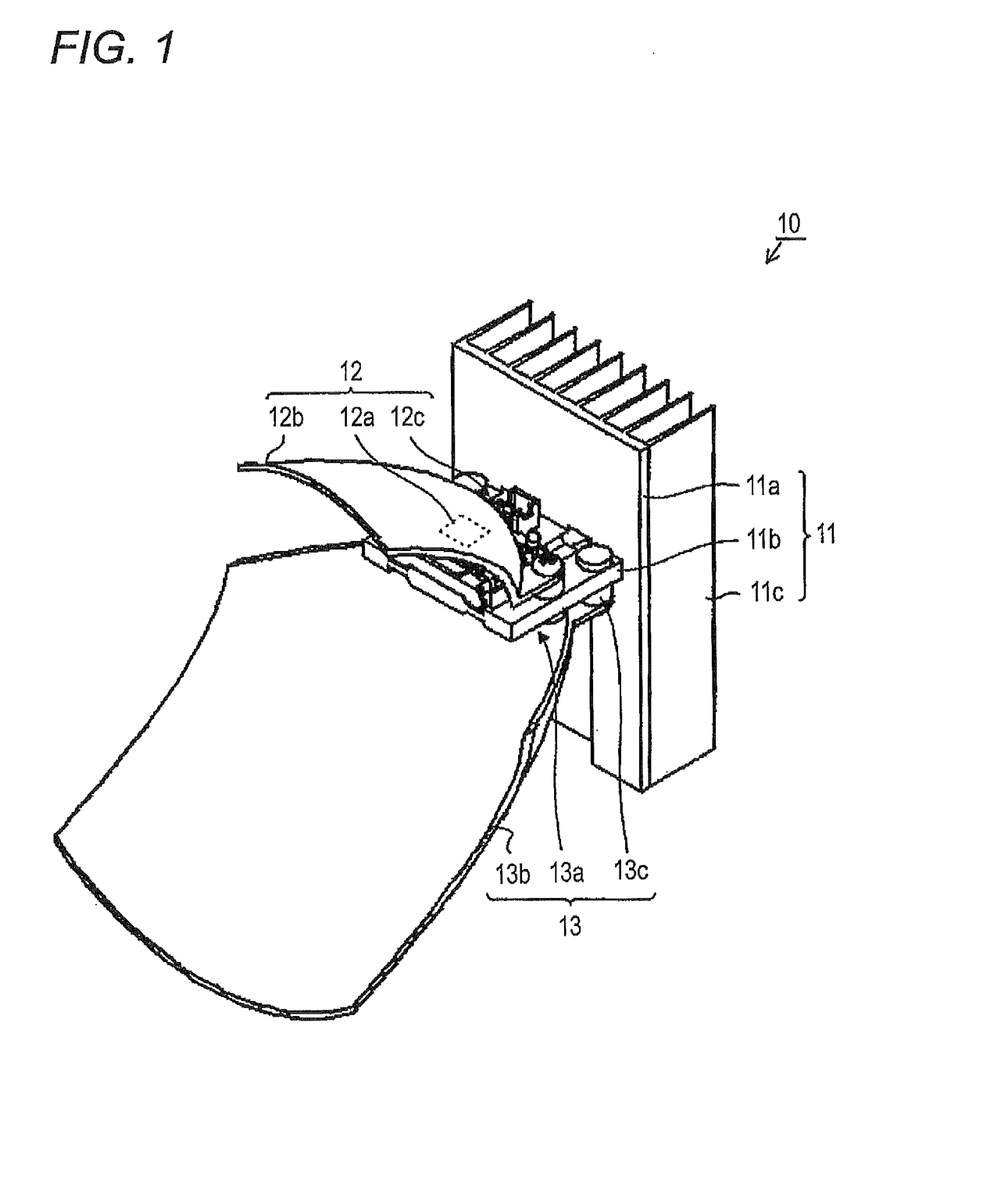
FIG. 1 is a perspective view of a vehicle head lamp 10 according to an embodiment realizing this invention.
Figure 2:
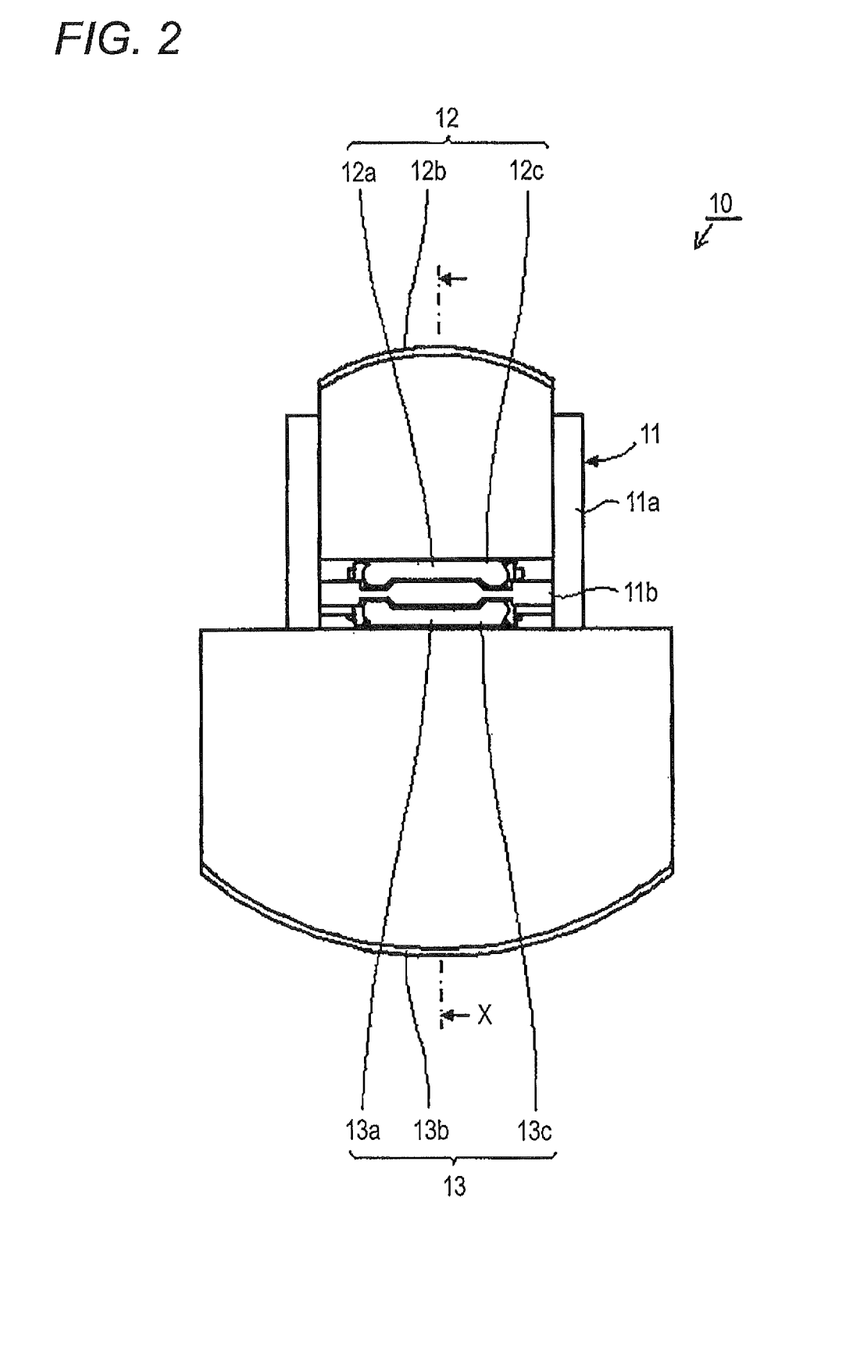
FIG. 2 is a front view of the vehicle head lamp 10.
Figure 3:
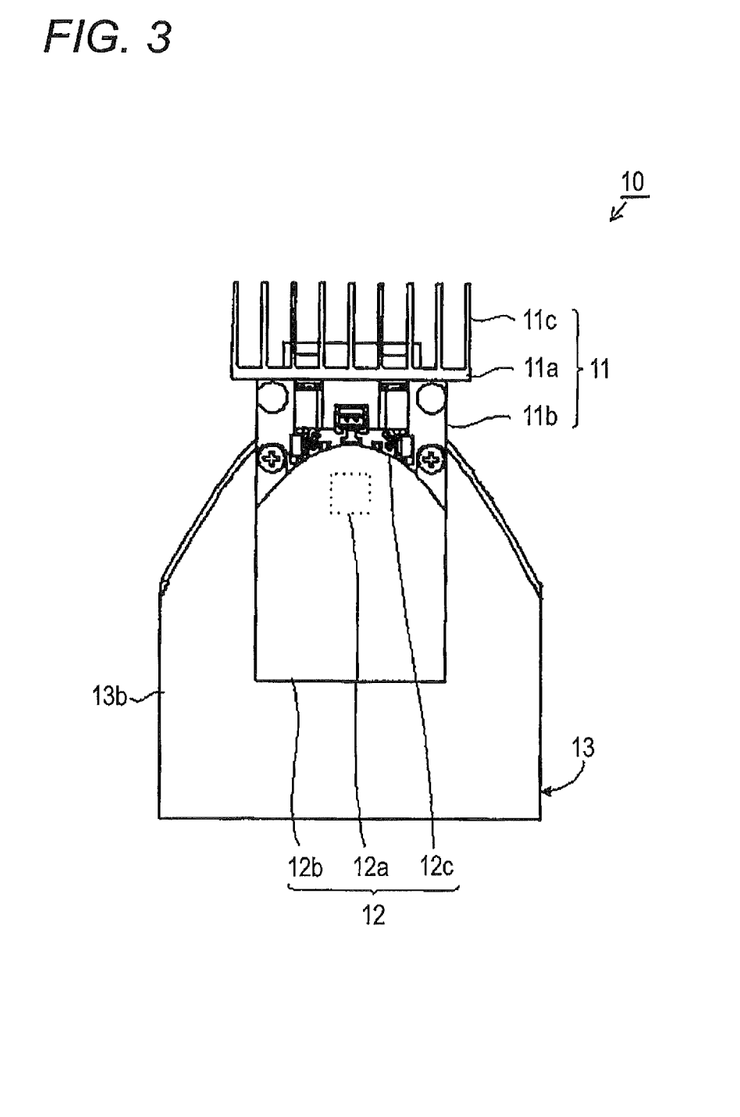
FIG. 3 is a top view of the vehicle head lamp 10.
Figure 4:
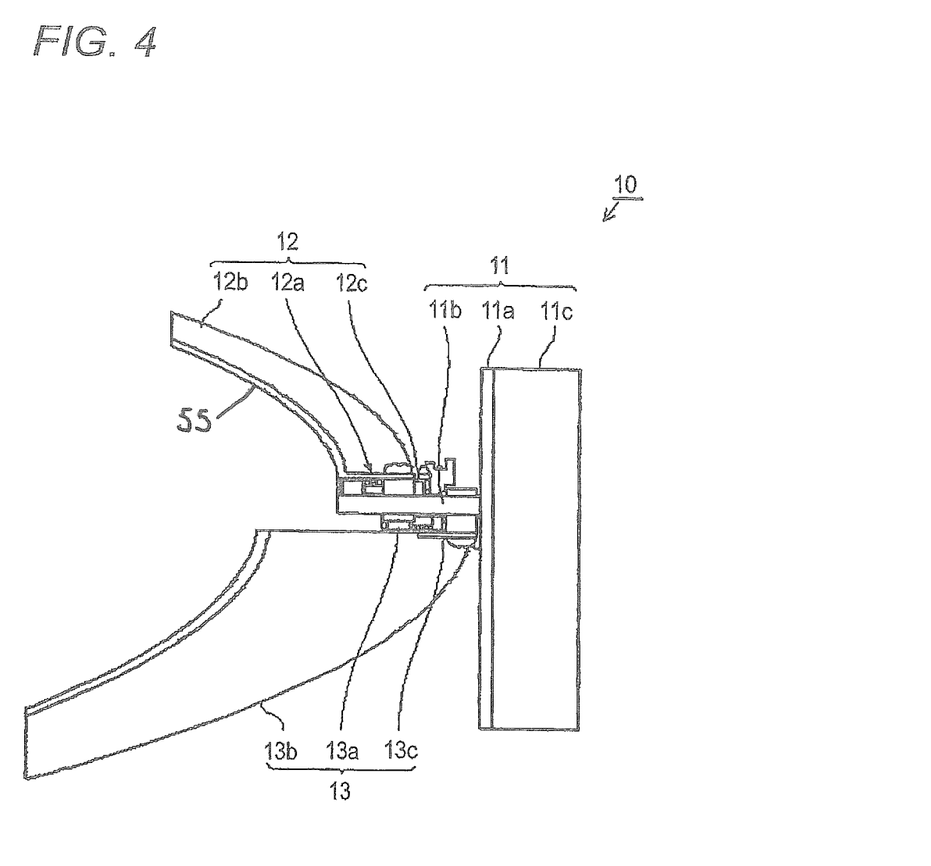
FIG. 4 is a right side view of the vehicle head lamp 10.

[6] As shown in FIGS. 4 and 5, the attachment position of the low-beam light source 12a to the light source attachment portion 11b is set to the forward side than the attachment position of the high-bream light source 13a.

Thus, since the direct light of the low-beam light source 12a is likely irradiated, the distribution light suitable for overhead road signs can be obtained.

Further, since the entire longitudinal length of the vehicle head lamp 10 can be suppressed from being large irrespective that the longitudinal length of the high-beam reflector 13b is large, the miniaturization of the vehicle head lamp 10 can be realized.

[7] The light source attachment portion 11b is integrally formed with the heat sink 11. The heat sink includes the radiation fin part 11c configured by the plurality of radiation fins which are protruded on the one side of the heat sink 11 opposing to the other side thereof where the light source attachment portion 11b is provided.

The attachment position of the high-beam light source 13a to the light source attachment portion 11b is set to be closer to the radiation fin part 11c than the attachment position of the low-beam light source 12a.

The high-beam light source 13a fixedly attached to the lower surface side of the light source attachment portion 11b is low in the heat radiation efficiency as compared with the low-beam light source 12a fixedly attached to the upper surface side of the light source attachment portion 11b.

Since the heat is easily transferred upward, if the high-beam light source 13a is located in front of the low-beam light source 12a, the heat of the high-beam light source 13a is transferred to the low-beam light source 12a. Accordingly the low-beam light source 12a is easily broken down. Further, since the heat of the high-beam light source 13a and the heat of low-beam light source 12a are combined, the radiation efficiency near the low-beam light source 12a is reduced.

In this respect, since the high-beam light source 13a is disposed at the position closer to the radiation fin part 11c, the heat radiation efficiency of the high-beam light source 13a can be improved.

[8] As shown in FIG. 5, in the high-beam light source unit 13, the center portion of the almost-flat light emitting face LP of the light source 13a coincides with the focal point Fb of the reflection face of the reflector 13b.

Thus, according to the high-beam light source unit 13, the distribution light spread toward the upper side in the vertical direction with respect to the extended surface (horizontal plane) extended from the lower face of the light source attachment portion 11b. Accordingly, the light distribution characteristics most suitable for the high beam can be realized.

[9] As shown in FIG. 5, in the low-beam light source unit 12, the rear end of the almost-flat light emitting face LP of the light source 12a coincides with the focal point Fa of the reflection face of the reflector 12b.

Thus, according to the low-beam light source unit 12, a clear cut line (shading boundary line) can be formed on the extended surface (horizontal plane) extended from the upper face of the light source attachment portion 11b.

Further, in the low-beam light source unit 12, the light emitting face LP of the light source 12a locates on the forward side than the focal point Fa of the reflection face of the reflector 12b.

Thus, according to the low-beam light source unit 12, the distribution light spread in the lower direction with respect to the extended surface extended from the upper face of the light source attachment portion 11b can be obtained.

As a result, according to the low-beam light source unit 12, since both the clear cut line and the distribution light spread in the lower direction of the cut line can be obtained, the light distribution characteristics most suitable for the low beam can be realized.

[10] In the low-beam light source unit 12, as to the light emitted from the light source 12a, the reflection light reflected by the reflection face of the reflector 12b is irradiated toward the lower side in the forward direction of the vehicle head lamp 10.

On the other hand, the direct light irradiated directly in the forward direction of the vehicle head lamp 10 from the light source 12a is shielded by the front end portion of the light source attachment portion 11b located in the forward side of the light source 12a. Thus, although this direct light is irradiated in the forward direction, this direct light is not irradiated toward the lower side in the forward direction.

Accordingly, in the low-beam light source unit 12, since the irradiation range of the reflection light from the reflector 12b can be different from the irradiation range of the direct light from the light source 12a, the generation of irradiation unevenness in the light distribution pattern can be prevented.

Alternatively, a shielding member may be provided in the forward direction of the light source 12a, separately from the light source attachment portion 11b, so that the shielding member shields the direct light from the light source 12a thereby not to irradiate the direct light toward the lower side in the forward direction.

This invention is not limited to the aforesaid respective aspects and the embodiment. This invention also includes various kinds of modifications and variations in a range easily thought by those skilled in the art without departing from the scope of the claimed invention.

The invention claimed is:

1. A head lamp for a vehicle, comprising:
   a low-beam light source unit that is a reflective type;
   a high-beam light source unit that is a reflective type and disposed beneath the low-beam light source unit; and
   a light source attachment portion fixedly holding the low-beam light source unit and the high-beam light source unit,
   wherein the low-beam light source unit is fixedly attached to an upper surface side of the light source attachment portion, and the high-beam light source unit is fixedly attached to a lower surface side of the light source attachment portion, such that the light source attachment portion is disposed between the low-beam light source unit and the high-beam light source unit,
   wherein the low-beam light source unit includes a low-beam light source and a low-beam reflector reflecting light emitted from the low-beam light source,
   wherein the high-beam light source unit includes a high-beam light source and a high-beam reflector reflecting light emitted from the high-beam light source,
   wherein an area of the high-beam reflector is larger than that of the low-beam reflector, and
   wherein a longitudinal length of the high-beam reflector is formed to be greater than a longitudinal length of the low-beam reflector.

2. The vehicle head lamp according to claim 1, wherein:
   a notch is formed at both sides of the low-beam reflector so that a reflection face is not provided; and
   a reflection face is formed at both sides of the high-beam reflector.

3. The vehicle head lamp according to claim 1, wherein the light source attachment portion extends parallel with an optical axis of head lamp.

4. The vehicle head lamp according to claim 1, wherein the high-beam light source is irradiated downward with respect to the light source attachment portion and the low-beam light source is irradiated upward with respect to the light source attachment portion.

5. The vehicle head lamp according to claim 1, wherein an upper surface side of the light source attachment portion is opposite a lower surface side of the light source attachment portion.

6. The vehicle head lamp according to claim 1, wherein a projector is absent in the high-beam light source unit and the low-beam light source unit.

7. A head lamp for a vehicle, comprising:
   a low-beam light source unit that is a reflective type;
   a high-beam light source unit that is a reflective type and disposed beneath the low-beam light source unit; and
   a light source attachment portion fixedly holding the low-beam light source unit and the high-beam light source unit,
   wherein the low-beam light source unit is fixedly attached to an upper surface side of the light source attachment portion, and the high-beam light source unit is fixedly attached to a lower surface side of the light source attachment portion, such that the light source attachment portion is disposed between the low-beam light source unit and the high-beam light source unit,
   wherein the low-beam light source unit includes a low-beam light source and a low-beam reflector reflecting light emitted from the low-beam light source,
   wherein the high-beam light source unit includes a high-beam light source and a high-beam reflector reflecting light emitted from the high-beam light source,
   wherein an area of the high-beam reflector is larger than that of the low-beam reflector,
   wherein the low-beam light source and the high-beam light source are fixedly attached to the light source attachment portion, and
   wherein an attachment position of the low-beam light source in the light source attachment portion is set to forward side than an attachment position of the high-beam light source.

8. The vehicle head lamp according to claim 7, further comprising:
   a heat sink integrally formed with the light source attachment portion; and
   a plurality of radiation fins protruded on one side of the heat sink opposing to other side thereof where the light source attachment portion is provided;
   wherein the attachment position of the high-beam light source to the light source attachment portion is set to be closer to the plurality of radiation fins than the attachment position of the low-beam light source.

* * * * *